Sept. 13, 1966  H. G. SASS  3,272,223
ROTATABLE SHUTTER VALVE
Filed June 3, 1964  3 Sheets-Sheet 2

INVENTOR.
HANS G. SASS

BY Webb, Burden, Robinson + Webb

ATTORNEYS.

Sept. 13, 1966  H. G. SASS  3,272,223
ROTATABLE SHUTTER VALVE
Filed June 3, 1964  3 Sheets-Sheet 3
Fig. 4
Fig. 5
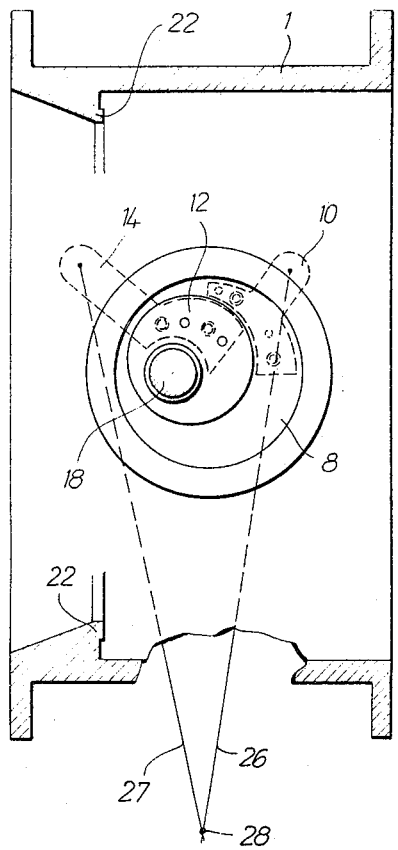
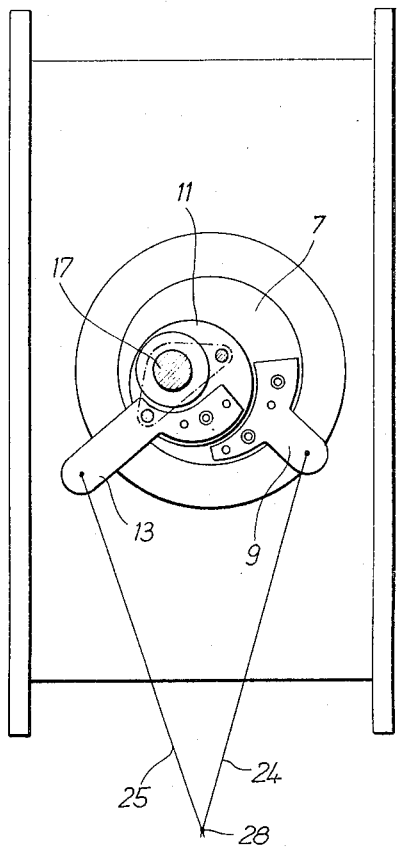
INVENTOR.
HANS G. SASS
BY Webb, Burden, Robinson + Webb
ATTORNEYS.

3,272,223
ROTATABLE SHUTTER VALVE
Hans G. Sass, Krefeld, Rhineland, Germany, assignor to Firma Industrie-Companie Kleinewefers Konstrucktions- und Handelsgesellschaft m.b.H., Krefeld, Rhineland, Germany, a corporation of Germany
Filed June 3, 1964, Ser. No. 372,312
Claims priority, application Germany, June 12, 1963, J 23,866
16 Claims. (Cl. 137—340)

This invention relates to a rotatable shutter valve, and more particularly to a shutter valve whose shaft which carries the valve disk is eccentrically supported in a rotatable mounting or bearing box. In a known embodiment (German Patent No. 969,984) of this type of rotatable shutter valve, the valve disk rotates 90° as its shaft rotates; and as its eccentric bearing turns, the sealing edge of the disk is moved toward or away from a seat disposed in the valve body or casing. In this type of shutter valve, the disk described an arced movement in a direction toward the sealing edge of the seat, which produces a lateral shifting of the disk edge with respect to the seat. Accordingly, it is difficult to effect an absolute shut-off of the valve; moreover, there is considerable wear at these points.

For these reasons, a rotatable shutter valve has been proposed in which the shaft makes a 90° rotation with the disk following the rotation. After the disk has rotated, movement thereof continues in a straight line with the direction of flow of the medium which is regulated so that the disk moves at right angles to the valve opening. In carrying out this movement, there is no lateral movement or shifting between the valve disk and its seat. However, in this embodiment, supplementary means such as mechanical guides for the disk and two curved members which abut against the disk and cause the perpendicular movement of the disk with respect to the valve opening are provided. Moreover, the shaft is guided in slots provided in ears or lugs on the disk, so that there is no rigid connection between the shaft and the disk. Therefore, it is impossible to supply a cooling or a heating medium to the disk itself through the shaft. Also, when the disk is in the open position, there is a substantial resistance to flow of a fluid through the valve.

In both this valve and other known rotatable shutter valves, hinges or curved guides are provided in the gas stream, and when hot gases come in contact with them, they cause considerable wear thereon. Even when specially adapted materials are used, it is still difficult to hold down this wear.

My invention is an improvement on known rotating shutter valves in which the disk rotates 90° and executes a sealing motion at right angles to the valve opening. In the device of the invention, supplementary means such as mechanical guides or curved pieces are eliminated and the shaft is securely joined to the disk. It is, therefore, possible to conduct a cooling or heating medium through the shaft and the disk. Consequently, in addition to simplicity of construction and good sealing properties, the valve can be used at either very high or very low temperatures of the medium whose flow is regulated.

This invention relates to a rotatable shutter valve which has a disk shaft eccentrically supported in a rotatable mounting or bearing box. When the disk shaft is rotated, the disk makes a 90° turn; and when the mounting is rotated, the sealing edge of the disk is moved into or out of engagement with the valve seat. To achieve the aforementioned advantages, my invention has each end of the shaft supported by first and second rotatable eccentric bearings with the first eccentric bearing being disposed within the second eccentric bearing concentrically. Of course, each eccentric bearing has a major portion and a minor portion. As a result of this arrangement, when the eccentric bearings are simultaneously rotated in opposite directions to one another, the valve disk moves in a straight line at right angles to the valve seat and the valve opening. In this straight line movement, the two eccentric bearings advance the disk between a first position whereat it is in engagement with the valve seat, and a second position whereat the disk is out of engagement with the valve seat and able to be rotated about its shaft. The two eccentric bearings at both ends of the shaft are so disposed relative to each other that when the disk is in the first position, the minor portion of each eccentric is closer to the plane of the seat than the major portion of each eccentric. Likewise, when the disk is in the second position, the minor portion of each eccentric is farther from the plane of the body seat than when the disk is in the first position. When the walls of the disk are smooth, the rotating movement and the linear movement of the disk are produced exclusively by means located in the walls of the valve body; in other words, in its open position, the disk offers no substantial resistance to flow of the fluid through the valve.

A further advantage of the invention includes support of the shaft upon the inner or first eccentric bearings by bushings which have a spherically shaped periphery. Likewise, the eccentric bore of the bearings is spherically shaped. If for any reason there should be any unevenness or irregularity when the disk is moved, or if dust or dirt should be deposited non-uniformly on the edge of the disk or upon the valve seat, then the closing movement of the disk adapts itself to these conditions since the ends of the shaft can assume the required position as a result of the spherically shaped periphery of the bushings and bearings.

In a further feature of the invention, the disk and its shaft are hollow and thus form a continuous cooling or heating system for flow of a cooling or heating medium therethrough. Thus, when the valve shutter is opened or closed linearly, the invention offers cooling or heating the disk itself, and particularly, the edge of the disk.

Rotation of the eccentrics is accomplished very simply by having each outer eccentric and its inner eccentric moved simultaneously by one lever apiece attached thereto and by the levers being connected together. In this way, it is only necessary to move one of these levers to cause reverse rotation of the eccentrics which are disposed within one another. Preferably, the levers which move the two pairs of eccentrics are jointly movable by a vane. Thus, I only move this vane to move all four eccentrics of the rotating shutter valve. The levers which rotate one pair of the eccentrics move in a direction opposite to that of the levers which turn the other pair of eccentrics. The rotating movement and the closing or opening motion of the disk may be carried out consecutively by automatic means, either mechanically or hydraulically operated.

The rotating shutter valve of the present invention offers some special advantages. In this regard, all moving parts (axles, shafts, bearings, etc.) project outwardly in such a manner that they may be cooled exteriorly of the valve whenever it is operated under high temperatures. It is also easy to lubricate the valve from the outside. Since opening and closing the valve is a straight line travel of the disk, this disk may be used for regulating and throttling purposes, and due to the rotating movement of the eccentrics, it is possible to achieve a high degree of accuracy in such regulation. Furthermore, it is very simple to install the disk in the valve, in that one inserts the shaft of the disk into the valve body and installs the pairs of eccentrics from the outside. The construction of the body or housing permits simple and economic manufacture which consists chiefly of machining and drilling.

In the accompanying drawings, I have shown a preferred embodiment of my invention, in which:

FIGURE 4 is a section view similar to FIGURE 3; and

FIGURE 5 is a plan view of the valve of FIGURE 1.

Figure 1:
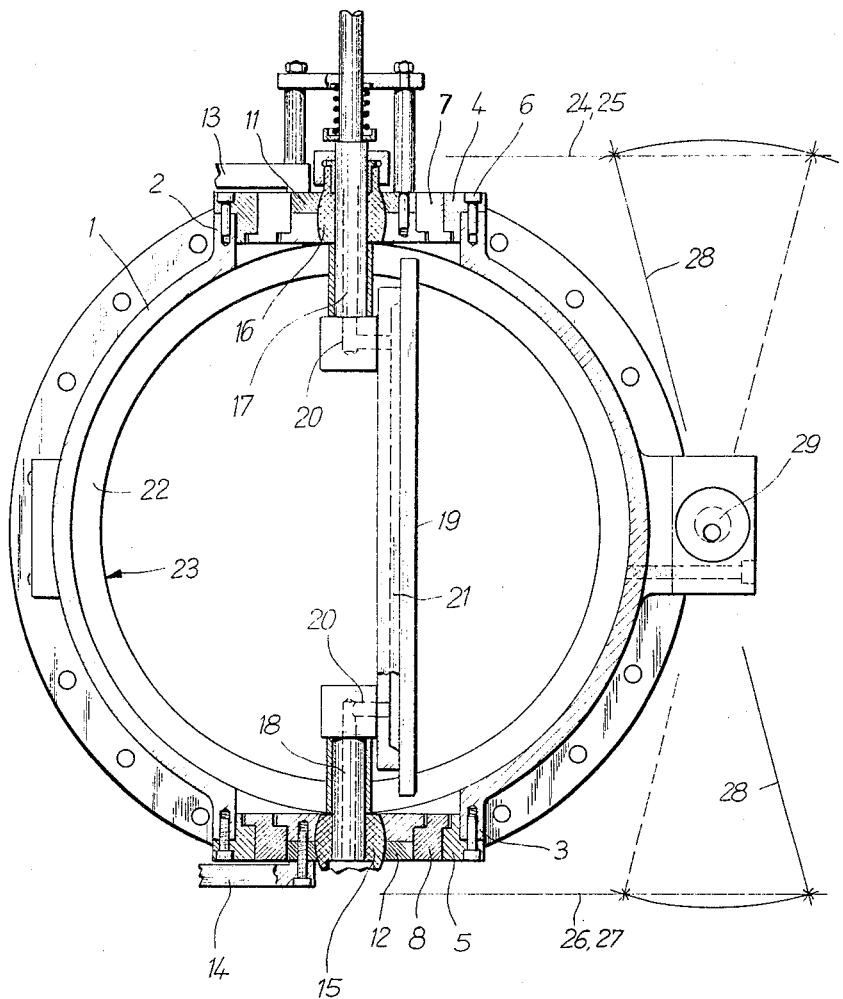
FIGURE 1 is a vertical view partially in section and showing the valve in the open position.

Referring to FIGURES 1–5, inclusive, tubular outer casing or body 1 of the valve has two opposing conventional flange-type lugs 2 and 3 to which inserts 4 and 5 are secured by screws 6. Within these inserts are outer eccentrics 7 and 8 to which are connected adjusting cams 9 and 10. Concentrically mounted within the outer eccentrics 7 and 8 are inner eccentrics 11 and 12, respectively, which are, in turn, provided with adjusting cams 13 and 14. Preferably, the inner eccentrics 11 and 12 are made in two parts and are provided with a spherically shaped bore to receive bearings 15 and 16 which are likewise spherically shaped. These bearings 15 and 16 receive hollow stub shafts 17 and 18 to which a disk 19 is rigidly connected. The stub shafts 17 and 18 have bores 20 which, in combination with a chamber 21 of the disk 19, form a passageway for flow of a heating or cooling medium through the disk. Thus, it is possible to conduct the cooling or heating medium through the bores 20 and the chamber 21 in any desired direction.

The valve body 1 has a valve heat 22 which is engaged by edge 19a of the disk 19 when the valve is closed. Moving the disk 90° from a position parallel to the valve seat 22 into the position shown in FIGURE 1 is effected by turning the shutter valve stub shafts 17 and 18 or just one of these stub shafts. The axes of rotation of these shafts are disposed substantially transversely of the central axis 22a of the opening 23 formed by the valve seat 22. When shutter 19 has been rotated 90° from the position shown in FIGURE 1 so that it is then parallel to valve seat 22, the two eccentrics 7 and 11 on the one hand, and 8 and 12 on the other hand (which together form the two pairs of eccentrics), are turned in opposite directions in such a way that the disk 19 moves in a straight line toward the valve opening 23, and edge 19a of the disk 19 also moves in a straight line toward the valve seat 22.

Adjusting cams 9 and 13 are turned by levers 24 and 25, and cams 10 and 14 are rotated by levers 26 and 27, all four levers being controlled by a vane 28. This vane 28 is made in two sections and at its center point is moved by an adjusting shaft 29 in such a way that levers 24 and 25 on the one hand, and levers 26 and 27 on the other hand, move in opposite directions. When levers 26 and 27 of FIGURE 1 are moved to the right, then levers 24 and 25 move to the left. This simultaneously causes the adjusting cams 9 and 13 and adjusting cams 10 and 14 to move in such a way that consequently the eccentrics which are disposed the one inside of the other impart a linear closing or opening motion of the disk 19.

The rotating movement of the shutter, as well as the closing or opening motion, can be carried out consecutively by automatic means.

Figure 2:
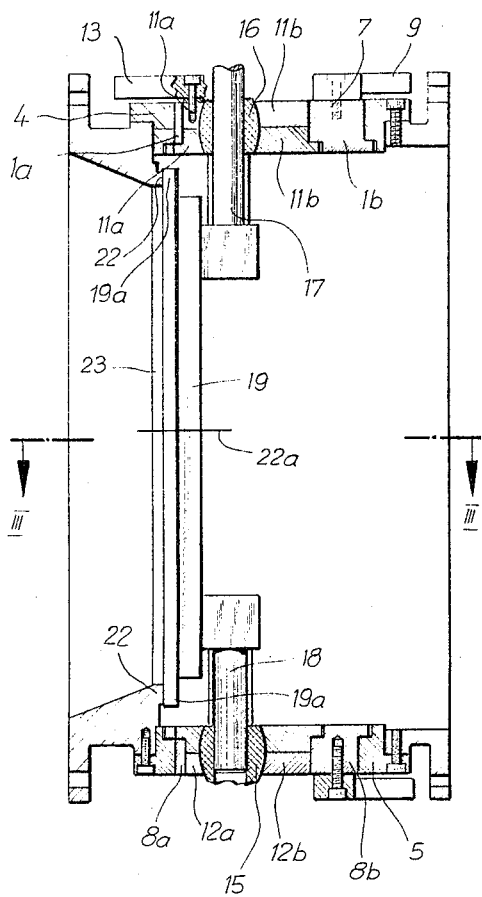
FIGURE 2 is a section view through the valve with its disk in engagement with the body seat.
Figure 3:
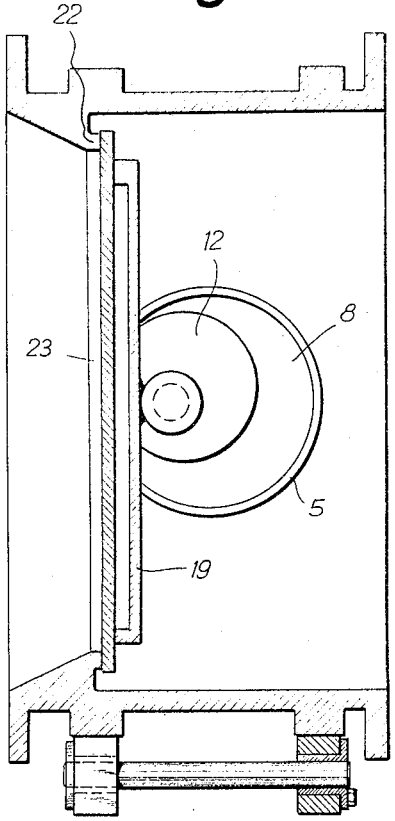
FIGURE 3 is a section view along line III—III of FIGURE 2.

As shown in FIGURE 2, when the valve is closed with the disk 19 in engagement with the valve seat 22, minor portions 7a and 8a of eccentrics 7 and 8, respectively, and minor portions 11a and 12a of eccentrics 11 and 12, respectively, are closer to the plane of the valve seat 22 than the major portions 7b, 8b, 11b and 12b of the eccentrics 7, 8, 11 and 12, respectively. Then, when eccentrics 7 and 11 and 8 and 12 have been rotated about their concentric axes in opposite directions to advance the disk 19 along a straight line path out of engagement with the seat 22, to the position of FIGURE 1, the minor portions 7a, 8a, 11a and 12a each has a location farther from the plane of the seat 22 than its location when the valve is closed (FIGURE 2).

While I have shown and described a preferred embodiment of my invention, it may be otherwise embodied within the scope of the appended claims.

I claim:

1. In a shutter valve having a body through which extends a passageway for flow of a fluid therethrough, said passageway having an inlet and an outlet, a body seat interposed between said inlet and outlet, the invention comprising a disk disposed in said passageway and movable into and out of engagement with said seat for regulation of flow of said fluid through said valve, a shaft joined to said disk and having a mounting upon said body which permits rotation of said disk about an axis disposed substantially transversely of the central axis of an opening formed by said body seat, rotation of said disk about said axis of rotation including placing same in a plane substantially parallel to the plane of said body seat, said mounting including first and second rotatable eccentrics, said first eccentric being concentrically disposed within said second eccentric, each eccentric having a major portion and a minor portion, said eccentrics being rotatable about their axes of rotation independently of said disk and being rotatable in opposite directions to each other, rotation of said two eccentrics in opposite directions to each other moving said disk along a path substantially normal to the plane of said seat between a first position whereat said disk is in engagement with said seat and a second position whereat said disk is out of engagement with said seat, said eccentrics being so disposed relative to each other that when said disk is in said first position, said minor portion of each eccentric is closer to the plane of said seat than said major portion of each eccentric, and that when said disk is in said second position, said minor portion of each eccentric is farther from the plane of said body seat than when said disk is in said first position.

2. The invention of claim 1 characterized by said shaft being rotatably received by said first eccentric.

3. The invention of claim 1 characterized by means connected to said two eccentrics for rotating same simultaneously about their axes of rotation in opposite directions to one another.

4. The invention of claim 1 characterized by said shaft being rotatably received by said first eccentric, that portion of said shaft rotatably received by said first eccentric having a spherically shaped peripheral surface and said eccentric having a complementary spherically shaped bore which receives said portion of said shaft.

5. The invention of claim 4 characterized by said first eccentric being formed from two segments each of which extends around said shaft.

6. The invention of claim 1 characterized by said shaft and said disk having an interconnected passageway extending therethrough for flow of one of a heating and of a cooling medium through said disk.

7. In a shutter valve having a body through which extends a passageway for flow of a fluid therethrough, said passageway having an inlet and an outlet, a body seat interposed between said inlet and outlet, the invention comprising a disk disposed in said passageway and movable into and out of engagement with said seat for regulation of flow of said fluid through said valve, a shaft joined to said disk, each end of said shaft having a mounting upon said body which permits rotation of said disk about an axis disposed substantially transversely of the central axis of an opening formed by said body seat, rotation of said disk about said axis of rotation including placing same in a plane substantially parallel to the plane of said body seat, said mounting including first and second eccentrics, said first eccentric being concentrically disposed within said second eccentric, each eccentric having a major portion and a minor portion, said eccentrics being rotatable about their axes of rotation independently of said disk and being rotatable in opposite directions to each other, rotation of said two eccentrics in opposite directions to each other moving said disk along a path substantially normal to the plane of said seat between a first position whereat said disk is in engagement with said seat and a second position whereat said disk is out of engagement with said seat, said eccentrics being so disposed relative to each other that when said disk is in said first position, said minor portion of each eccentric is closer to the plane of said seat than said major portion of each eccentric, and that when said disk is in said second position, said minor portion of each eccentric is farther from the plane of said body seat than when said disk is in said first position.

8. The invention of claim 7 characterized by said shaft being rotatably received by said first eccentric.

9. The invention of claim 7 characterized by said shaft being rotatably received by said first eccentric, that portion of said shaft rotatably received by said first eccentric having a spherically shaped peripheral surface and that eccentric having a complementary spherically shaped bore which receives said portion of said shaft.

10. The invention of claim 9 characterized by said first eccentric being formed from two segments each of which extends around said shaft.

11. The invention of claim 7 characterized by means connected to said two eccentrics for rotating same simultaneously about their axes of rotation in opposite directions to one another.

12. In a shutter valve having a body through which extends a passageway for flow of a fluid therethrough, said passageway having an inlet and an outlet, a body seat interposed between said inlet and outlet, the invention comprising a disk disposed in said passageway and movable into and out of engagement with said seat for regulation of flow of said fluid through said valve, first and second shafts joined to said disk at substantially diametrically opposite sides of said disk, each shaft having a mounting upon said body which permits rotation of said disk about an axis disposed substantially transversely of the central axis of an opening formed by said body seat, rotation of said disk about said axis of rotation including placing same in a plane substantially parallel to the plane of said body seat, said mounting including first and second eccentrics, said first eccentric being concentrically disposed within said second eccentric, each eccentric having a major portion and a minor portion, said eccentrics being rotatable about their axes of rotation independently of said disk and being rotatable in opposite directions to each other, rotation of said two eccentrics in opposite directions to each other moving said disk along a path substantially normal to the plane of said seat between a first position whereat said disk is in engagement with said seat and a second position whereat said disk is out of engagement with said seat, said eccentrics being so disposed relative to each other that when said disk is in said first position, said minor portion of each eccentric is closer to the plane of said seat than said major portion of each eccentric, and that when said disk is in said second position, said minor portion of each eccentric is farther from the plane of said body seat that when said disk is in said first position.

13. The invention of claim 12 characterized by said shaft being rotatably received by said first eccentric.

14. The invention of claim 12 characterized by said shaft being rotatably received by said first eccentric, that portion of said shaft rotatably received by said first eccentric having a spherically shaped peripheral surface and said first eccentric having a complementary spherically shaped bore which receives said portion of said shaft.

15. The invention of claim 14 characterized by said first eccentric being formed from two segments each of which extends around said shaft.

16. The invention of claim 12 characterized by means connected to said two eccentrics for rotating same simultaneously about their axes of rotation in opposite directions to one another.

References Cited by the Examiner

UNITED STATES PATENTS

| 1,442,452 | 1/1923 | Taylor | 251—161 |
| 1,803,773 | 5/1931 | Schmidt et al. | 251—160 |
| 2,705,016 | 3/1955 | Saar | 137—340 X |
| 2,811,981 | 11/1957 | Harris | 251—161 X |
| 2,919,885 | 1/1960 | Daigle | 251—308 X |
| 3,008,685 | 11/1961 | Rudden | 251—160 |
| 3,124,333 | 3/1964 | Sivyer | 251—161 |

M. CARY NELSON, *Primary Examiner.*

S. SCOTT, *Examiner.*

UNITED STATES PATENT OFFICE
CERTIFICATE OF CORRECTION

Patent No. 3,272,223                              September 13, 1966

Hans G. Sass

It is hereby certified that error appears in the above numbered patent requiring correction and that the said Letters Patent should read as corrected below.

Column 3, line 33, for "valve heat" read -- valve seat --; lines 62 and 63, for "of the disk 19" read -- to the disk 19 --; column 6, line 18, for "that when said disk" read -- than when said disk --.

Signed and sealed this 1st day of August 1967.

(SEAL)
Attest:

Edward M. Fletcher, Jr.                          EDWARD J. BRENNER
Attesting Officer                                 Commissioner of Patents